(No Model.)
B. C. DORSEY.
DISK SEEDER AND CULTIVATOR.
No. 344,950. Patented July 6, 1886.
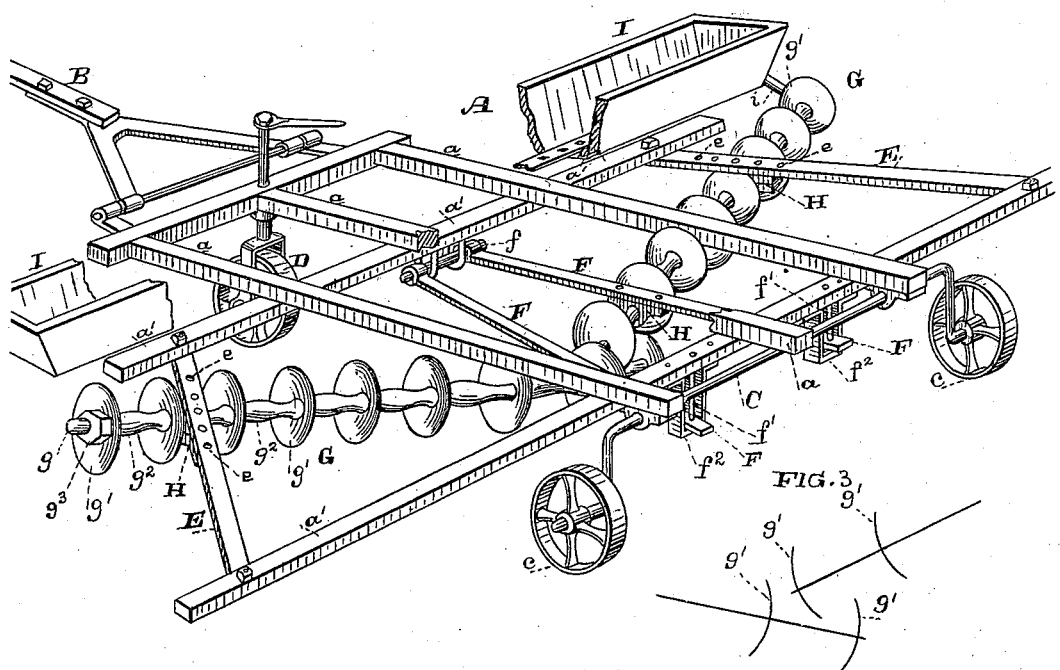
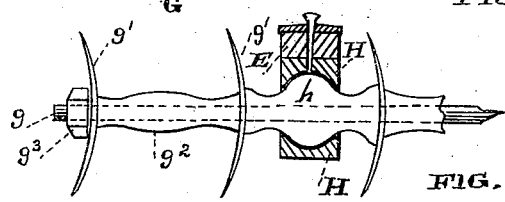
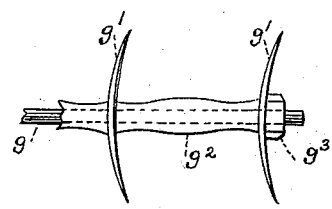

UNITED STATES PATENT OFFICE.

BASIL CLINTON DORSEY, OF PORTERSVILLE, CALIFORNIA.

DISK SEEDER AND CULTIVATOR.

SPECIFICATION forming part of Letters Patent No. 344,950, dated July 6, 1886.

Application filed October 21, 1885. Serial No. 180,547. (No model.)

*To all whom it may concern:*

Be it known that I, BASIL CLINTON DORSEY, of Portersville, Tulare county, State of California, have invented an Improvement in Disk Seeders and Cultivators; and I hereby declare the following to be a full, clear, and exact description of the same.

My invention relates to the class of seeding and cultivating machines; and my invention consists in a peculiar wheeled-frame having a seed-box and carrying inclined or angled bars the outermost ones of which are fixed, and the innermost are automatically adjustable; in two inclined disk-gangs mounted in the inclined bars, the inner or adjacent ends of the disk-gangs being made to overlap; in novel boxes in which the shafts of the disk-gangs are mounted, and in details of construction, all of which I shall hereinafter fully describe.

The object of my invention is to provide a combined disk cultivator and seeder, to cause all the disks of the gangs to cut to the same depth; to so arrange them that there shall be no uncultivated strip in the center, and, generally, to provide a simple and effective seeder and cultivator.

Referring to the accompanying drawings, Figure 1 is a perspective view of my disk seeder and cultivator. Fig. 2 is a section of the boxes H. Fig. 3 is a diagram showing the overlapping feature of the disk-gangs. Fig. 4 is a section showing the play of the rear ends of the bars F.

The frame A consists of the three longitudinal pieces $a$, the two long transverse pieces $a'$, and such other cross-pieces as may be found necessary to stiffen it.

B is the tongue.

C is a crank-axle at the rear of the frame, having wheels $c$, and operated by a suitable lever, (not shown,) whereby the frame may be vertically adjusted.

D is a swivel-wheel in the front center of the frame. The frame is therefore mounted on three wheels, and is wholly carried thereby.

Between the outer ends of the long transverse pieces $a'$ are firmly and rigidly secured the inclined or angled bars E. F are similar bars nearer the center; but they are not fixed. Their forward ends are secured to the ends of a short rock-shaft, $f$, journaled under the forward cross-piece, $a'$, and their rear ends play loosely on hanger-bolts $f'$ and are guided in stirrups $f^2$.

G are the disk-gangs. These consist of shafts $g$, fitted with the disks or cutters $g'$, between each of which are the spool-like castings $g^2$, whereby by the setting up of nuts $g^3$ on the ends of the shafts, all the disks can be tightened to their seats in the usual manner. The disks are concaved or cupped outwardly, so that they throw the dirt from the center. The inner or adjacent ends of the disk-gangs, it will be specially observed, overlap, the end disk of one gang operating between the end two of the other gang. This is an important feature of my invention, as it effects a result which, as far as I am aware, has never been done before by a disk-cultivator. Generally, the disk-gangs abut as near as possible. If the disks are cupped outwardly, the innermost of each gang, throwing from the center, leaves a strip of uncultivated ground, while, if they are cupped inwardly, they throw up a ridge in the center, by reason of not being adapted, on account of their shape, to be brought close together; but by overlapping them as I have shown, and cupping them outwardly, neither of these results follow, but the center is cultivated equally with the sides.

H are the boxes by which the shafts of the disk-gangs are mounted under the inclined bars E F. These boxes are adapted to be adjusted forward or back on the bars, in order to vary the angle of inclination of the disk-gangs. This is done by having a series of holes, $e$, made in the bars, and bolting the boxes in them in suitable positions. Now, by reason of the fact that the inner bars, F, are adapted to play up and down loosely, the outer boxes H are so constructed as to allow the shafts of the disk-gangs a play sufficient to permit their inner ends to follow the loosely-playing bars F. The inner ends of the disk-gangs have therefore a vertical adjustment, while their outer ends are held practically in the same vertical plane. The object of this is as follows: In machines where the disk-gangs are held in the same vertical plane throughout their length, the outer disks of the gangs drag and cut deeper than the inner ones, even to the extent of entering the soil twice as far; but by holding the outer ends of the gangs steady and allowing their inner ends some play, this is corrected and all the disks cut to an equal depth.

In order to obtain a direct draft on the disk-gang boxes and prevent wear or cramping, I make the boxes H with approximately elliptical sockets, and make the journals $h$ of the disk gang-shafts of a corresponding shape. This strengthens the journal, and enables an inclined draft to be applied directly.

The seed-box I is mounted on the frame in front of the disk-gangs. It may be of any suitable pattern, operated by suitable means, though preferably by any connecting mechanism, such as $i$, from the disk-gangs. In my machine I remedy this by mounting both the seed-box and the cutters or disks on a wheeled frame, so that the weight of the box is not borne by the cutters, which may therefore be adjusted as required.

By providing a frame with wheels behind and a swivel-wheel in front the whole machine may readily be turned and guided.

Having thus described my invention, what I claim as new, and desire to secure by Letters Patent, is—

1. The disk-gangs G, the disks or cutters of which are cupped or concaved outwardly to throw the dirt from the center, said gangs having their inner or adjacent ends overlapping, with the innermost cutter or disk of one working between the innermost two of the other, substantially as herein described.

2. The disk-gangs G, supported near their outer ends by a fixed bearing and near their inner ends by a vertically-moving bearing, substantially as herein described.

3. The disk-gangs G, in combination with the frame, the fixed bars E, in which the outer ends of the gangs are journaled, and the pivoted vertically-playing bars F, in which their inner ends are journaled, substantially as herein described.

4. The frame A, consisting of pieces $a\,a'$, the bars E, secured to the pieces $a'$ near their outer ends, the bars F, the rock-shaft $f$, to which their forward ends are secured, and the hanger-bolts $f'$ and stirrups $f^2$ on and in which their rear ends play loosely, in combination with the disk-gangs G, journaled on bars E F, substantially as herein described.

5. The inclined bars E and F of the main frame and the inclined disk-gangs G, in combination with the boxes H on the bars, having approximately-elliptical grooves, and the corresponding journals $h$ on the shafts of the disk-gangs, substantially as herein described.

6. The frame A, having a wheeled rear crank-axle, C, and a swivel-wheel, D, in front, the fixed inclined bars E, and the loosely-playing or pivoted bars F on the frame, in combination with the inclined disk-gangs G, mounted in bearings on the bars E and F, substantially as herein described.

7. The frame A, having a wheeled rear crank-axle, C, and a swivel-wheel, D, in front, the seed-box I on said frame, in combination with the disk-gangs G, carried by the frame, substantially as herein described.

8. A disk seeder and cultivator consisting of the frame A, having extended cross-pieces $a'$, the wheeled crank-axle C on the rear of the frame, and the swivel-wheel D on its front, the seed-box I, the inclined fixed bars E on the outer ends of the cross-pieces, the inclined loosely playing or pivoted bars F nearer the center, and the disk-gangs G, mounted in the bars E and F, their inner or adjacent ends overlapping, substantially as herein described.

In witness whereof I have hereunto set my hand.

BASIL CLINTON DORSEY.

Witnesses:
S. H. NOURSE,
H. C. LEE.